(12) United States Patent
Li et al.

(10) Patent No.: US 12,248,407 B2
(45) Date of Patent: Mar. 11, 2025

(54) PAGE SWAP METHOD, STORAGE SYSTEM, AND ELECTRONIC DEVICE

(71) Applicant: Huawei Technologies Co., Ltd., Shenzhen (CN)

(72) Inventors: Changlong Li, Shenzhen (CN); Jian Yi, Shanghai (CN); Weilai Zhou, Shanghai (CN); Wei Du, Shanghai (CN); Jiaxin Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/922,276

(22) PCT Filed: Mar. 24, 2021

(86) PCT No.: PCT/CN2021/082671
§ 371 (c)(1),
(2) Date: Oct. 28, 2022

(87) PCT Pub. No.: WO2021/218502
PCT Pub. Date: Nov. 4, 2021

(65) Prior Publication Data
US 2023/0176980 A1   Jun. 8, 2023

(30) Foreign Application Priority Data
Apr. 30, 2020   (CN) .......................... 202010360522.8

(51) Int. Cl.
*G06F 12/122*   (2016.01)

(52) U.S. Cl.
CPC .... *G06F 12/122* (2013.01); *G06F 2212/1016* (2013.01)

(58) Field of Classification Search
None
See application file for complete search history.

(56) References Cited

U.S. PATENT DOCUMENTS

| | | | | |
|---|---|---|---|---|
| 9,710,383 | B1 * | 7/2017 | Xu | ....................... G06F 12/0246 |
| 10,671,534 | B2 * | 6/2020 | Lee | ................... H04N 21/42669 |
| 2002/0065992 | A1 * | 5/2002 | Chauvel | .............. G06F 12/1027 |
| | | | | 712/E9.033 |
| 2012/0246408 | A1 * | 9/2012 | Yamamura | .......... G06F 12/0842 |
| | | | | 711/125 |
| 2014/0115241 | A1 * | 4/2014 | Wei | ..................... G06F 12/0246 |
| | | | | 711/103 |

(Continued)

FOREIGN PATENT DOCUMENTS

| | | |
|---|---|---|
| CN | 102831069 A | 12/2012 |
| CN | 105988875 A | 10/2016 |

(Continued)

*Primary Examiner* — Stephanie Wu
(74) *Attorney, Agent, or Firm* — Slater Matsil, LLP

(57) ABSTRACT

A page swap method, a storage system, and an electronic device as applied to the field of memory management technologies are provided. The method includes determining, from a least recently used LRU linked list, a to-be-swapped-out first swap-out page of a memory device, determining a second swap-out page from the LRU linked list based on the first swap-out page, and when the first swap-out page is swapped out of the memory device, swapping out the first swap-out page and the second swap-out page to a swap device.

20 Claims, 5 Drawing Sheets

(a) Page swap-out process (b) Page swap-in process (56) References Cited

U.S. PATENT DOCUMENTS

| | | | |
|---|---|---|---|
| 2015/0149688 A1* | 5/2015 | Yun | G06F 3/0632 |
| | | | 711/170 |
| 2017/0024326 A1 | 1/2017 | Luo et al. | |
| 2017/0109290 A1* | 4/2017 | Albot | G06F 12/1027 |
| 2017/0109291 A1 | 4/2017 | Albot et al. | |
| 2017/0168957 A1* | 6/2017 | Christidis | G06F 12/084 |
| 2018/0189182 A1* | 7/2018 | Wang | G06F 12/0864 |
| 2018/0300243 A1* | 10/2018 | Pirvu | G06F 11/34 |
| 2019/0294365 A1* | 9/2019 | Yoshii | G06F 3/0647 |
| 2020/0026659 A1 | 1/2020 | Olderdissen et al. | |

FOREIGN PATENT DOCUMENTS

| | | |
|---|---|---|
| CN | 106294192 A | 1/2017 |
| CN | 106970881 A | 7/2017 |
| CN | 107885666 A | 4/2018 |
| CN | 108089998 A | 5/2018 |
| CN | 108710584 A | 10/2018 |
| CN | 109508301 A | 3/2019 |
| CN | 110018900 A | 7/2019 |
| CN | 110888821 A | 3/2020 |
| CN | 110955495 A | 4/2020 |
| CN | 111078410 A | 4/2020 |
| CN | 111078587 A | 4/2020 |

\* cited by examiner

FIG. 1

(a) Page swap-out process (b) Page swap-in process

(a) Page swap-out process (b) Page swap-in process

PAGE SWAP METHOD, STORAGE SYSTEM, AND ELECTRONIC DEVICE

CROSS-REFERENCE TO RELATED APPLICATIONS

This application is a national stage of International Application No. PCT/CN2021/082671, filed on Mar. 24, 2021, which claims priority to Chinese Patent Application No. 202010360522.8, filed on Apr. 30, 2020 Both of the aforementioned applications are hereby incorporated by reference in their entireties.

TECHNICAL FIELD

This application relates to the field of memory management technologies, and in particular, to a page swap method, a storage system, and an electronic device.

BACKGROUND

With an increasing usage rate of a terminal device by a user, more and more applications are installed by the user, and requirements of various applications for a memory capacity of the terminal device are also growing. For example, a plurality of common applications such as a chat application, a game application, and a camera application each occupy the memory capacity of the terminal device by kilomegabyte (kilomegabyte, GB). However, the memory capacity of the terminal device is limited.

To relieve pressure on a memory of the terminal device, in a use process of the application, a system may reclaim some pages, such as pages used for mapping a process heap, a stack, a data segment, and a shared memory (shmem), to other space based on a page swap technology. A page is a minimum unit of address space in a memory management process.

Because a page swap-out process and a page swap-in process included in the page swap technology have time overheads, performance of the system is affected.

SUMMARY

This application provides a page swap method, a storage system, and an electronic device, to improve accuracy of page swapping and running performance of a system in a page swap process.

According to a first aspect, a page swap method is provided. The method is applied to a storage system including a processor, a memory device, and a swap device, the memory device stores a plurality of pages of different applications, and the method includes: determining, from a least recently used LRU linked list, a to-be-swapped-out first swap-out page of the memory device; determining a second swap-out page from the LRU linked list based on the first swap-out page; and when the first swap-out page is swapped out of the memory device, consecutively swapping out the first swap-out page and the second swap-out page to the swap device.

According to the page swap method provided in this embodiment of this application, for one of to-be-swapped-out pages in the LRU linked list, one or more other to-be-swapped-out pages belonging to a same application as the one to-be-swapped-out page are determined based on the one to-be-swapped-out page. Further, in a page swap-out process, the pages that belong to the same application and that are in the to-be-swapped-out pages are preferentially swapped out consecutively, and swap-out pages that belong to the same application are stored consecutively in the swap device. In the page swap-out process, logically related pages of a same application can be stored consecutively based on a logical correlation of the to-be-swapped-out pages and an LRU linked list sequence.

With reference to the first aspect, in some implementations of the first aspect, the first swap-out page and the second swap-out page have a same application identifier, and the determining a second swap-out page from the LRU linked list based on the first swap-out page includes: determining the application identifier of the first swap-out page, and determining, from the LRU linked list, a to-be-swapped-out page that has a same application identifier as the first swap-out page, as the second swap-out page.

It should be understood that each application (application, APP) used by a user has a unique identifier (identifier, ID). In a use process of the application, a memory capacity may be applied for in sequence, and different areas are divided for different applications based on a user request.

It should be further understood that the method in this application may be further used in different service processes. Each service may include a plurality of processes, and each service may have a fixed identifier or each process may have a different identifier. In this case, in the page swap-out process, in addition to the application identifier, the system may further perform the page swap-out process based on a process identifier or a service identifier.

For example, a system may determine, based on a service identifier, to swap out a page having the same service identifier to the swap device. Correspondingly, in a page swap-in process, an adjacent page having the same service identifier as a target page is swapped into the memory device.

Alternatively, in the page swap-out process, a system may determine, based on a process identifier, to swap out a page having the same process identifier to the swap device. Correspondingly, in a page swap-in process, an adjacent page having the same process identifier as a target page is swapped into the memory device. This is not limited in this embodiment of this application.

With reference to the first aspect and the foregoing implementations, in some implementations of the first aspect, the memory device stores a memory mapping table, the memory mapping table is used to indicate a correspondence between a logical address and an application identifier of each of the plurality of pages, and the determining a second swap-out page from the LRU linked list based on the first swap-out page includes: obtaining a logical address of the first swap-out page; determining the application identifier of the first swap-out page based on the memory mapping table and the logical address of the first swap-out page; and determining, from the LRU linked list, the to-be-swapped-out page that has the same application identifier as the first swap-out page, as the second swap-out page.

In conclusion, according to the page swap method provided in this embodiment of this application, for a to-be-swapped-out page in an LRU linked list, an application identifier of each page is further determined by determining a logical address of each to-be-swapped-out page, to determine to-be-swapped-out pages belonging to a same application. Further, in a page swap-out process, the pages that belong to the same application and that are in the to-be-swapped-out pages are preferentially swapped out consecutively, and swap-out pages that belong to the same application are stored consecutively in the swap device. In the page swap-out process, logically related pages of a same application can be stored consecutively based on a logical correlation of the to-be-swapped-out pages and an LRU linked list sequence.

Optionally, the memory device in this embodiment of this application includes a memory manager, and the memory manager may maintain the memory mapping table.

When the user uses an application A, the application A requests a memory capacity from the processor, and the processor may obtain an ID of the application A, and allocate, based on a request of the application A and in the memory device, a memory area whose logical address is PGD 1 to the application A and a memory area whose logical address is PGD 2 to an application B. Accordingly, the memory mapping table of the system may be obtained, and the memory manager of the memory device may store the memory mapping table.

With reference to the first aspect and the foregoing implementations, in some implementations of the first aspect, the method further includes: in response to a swap-in request for the target page, swapping the target page from the swap device to the memory device, and preloading the adjacent page of the target page.

Correspondingly, in the page swap-in process, for the to-be-swap-in target page, according to a prefetch principle, the target page and the adjacent page of the target page may be swapped into the memory device, or the target page is swapped in from the swap device to the memory device, and the adjacent page of the target page is preloaded. In the preloading process, preloading may be implemented by the memory manager by using a cache (cache). Details are not described herein again. This process can ensure that a swap-in page is a logically related page of a same application, so that prefetch accuracy in the swap-in process is improved. This improves running performance of the system.

With reference to the first aspect and the foregoing implementations, in some implementations of the first aspect, the consecutively swapping out the first swap-out page and the second swap-out page to the swap device includes: simultaneously swapping out the first swap-out page and the second swap-out page to the swap device; or consecutively swapping out the first swap-out page and the second swap-out page to the swap device in a first sequence.

With reference to the first aspect and the foregoing implementations, in some implementations of the first aspect, the first sequence is an arrangement sequence of pages with a same application identifier in the LRU linked list.

With reference to the first aspect and the foregoing implementations, in some implementations of the first aspect, the logical address of each of the plurality of pages is a page global directory PGD address.

With reference to the first aspect and the foregoing implementations, in some implementations of the first aspect, the method further includes: determining a quantity of the to-be-swapped-out pages according to a space capacity of the memory device; and determining a quantity of the to-be-swapped-in target pages according to the space capacity of the memory device.

According to a second aspect, an electronic device is provided. The electronic device includes a processing unit, a memory device, and a swap device, the memory device stores a plurality of pages of different applications, and the processing unit is configured to: determine, from a least recently used LRU linked list, a to-be-swapped-out first swap-out page of the memory device; determine a second swap-out page from the LRU linked list based on the first swap-out page; and when the first swap-out page is swapped out of the memory device, consecutively swap out the first swap-out page and the second swap-out page to the swap device.

With reference to the second aspect, in some implementations of the second aspect, the first swap-out page and the second swap-out page have a same application identifier, and the processing unit is specifically configured to: determine the application identifier of the first swap-out page, and determine, from the LRU linked list, a to-be-swapped-out page that has a same application identifier as the first swap-out page, as the second swap-out page.

With reference to the second aspect and the foregoing implementations, in some implementations of the second aspect, the memory device stores a memory mapping table, the memory mapping table is used to indicate a correspondence between a logical address and an application identifier of each of the plurality of pages, and the electronic device further includes: an obtaining unit, configured to obtain a logical address of the first swap-out page. The processing unit is further configured to: determine the application identifier of the first swap-out page based on the memory mapping table and the logical address of the first swap-out page; and determine, from the LRU linked list, the to-be-swapped-out page that has the same application identifier as the first swap-out page, as the second swap-out page.

With reference to the second aspect and the foregoing implementations, in some implementations of the second aspect, the processing unit is further configured to:

in response to a swap-in request for a target page, swap the target page from the swap device to the memory device, and preload an adjacent page of the target page.

With reference to the second aspect and the foregoing implementations, in some implementations of the second aspect, the processing unit is specifically configured to: simultaneously swap out the first swap-out page and the second swap-out page to the swap device; or consecutively swap out the first swap-out page and the second swap-out page to the swap device in a first sequence.

With reference to the second aspect and the foregoing implementations, in some implementations of the second aspect, the first sequence is an arrangement sequence of pages with a same application identifier in the LRU linked list.

With reference to the second aspect and the foregoing implementations, in some implementations of the second aspect, the logical address of each of the plurality of pages is a page global directory PGD address.

With reference to the second aspect and the foregoing implementations, in some implementations of the second aspect, the processing unit is further configured to: determine a quantity of the to-be-swapped-out pages according to a space capacity of the memory device; and determine a quantity of the to-be-swapped-in target pages according to the space capacity of the memory device.

According to a third aspect, an electronic device is provided, including: one or more processors; a memory; a memory device and a swap device; a plurality of applications; and one or more programs. The one or more programs are stored in the memory, and when the one or more programs are executed by the processor, the electronic device is enabled to perform the method according to any one of the first aspect and the implementations of the first aspect.

According to a fourth aspect, an apparatus is provided. The apparatus is included in an electronic device, and the apparatus has functions of implementing behavior of the electronic device in the foregoing aspects and the possible implementations of the foregoing aspects. The function may be implemented by hardware, or may be implemented by hardware executing corresponding software. The hardware or the software includes one or more modules or units corresponding to the function, for example, a display module or unit, a detection module or unit, or a processing module or unit.

According to a fifth aspect, a storage system is provided. The storage system includes: a memory device and a swap device; and a processor and an interface. The processor and the interface cooperate with each other, so that the storage system performs the method according to any one of the first aspect and the implementations of the first aspect.

According to a sixth aspect, this application provides an electronic device, including a touch display. The touch display includes: a touch-sensitive surface and a display; a camera; one or more processors; a memory; a memory device and a swap device; a plurality of applications; and one or more computer programs. The one or more computer programs are stored in the memory, and the one or more computer programs include instructions. When the instructions are executed by the electronic device, the electronic device is enabled to perform the method according to any one of the first aspect and the implementations of the first aspect.

According to a seventh aspect, this application provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is enabled to perform the method according to any one of the first aspect and the implementations of the first aspect.

According to an eighth aspect, this application provides a computer-readable storage medium, including computer instructions. When the computer instructions are run on an electronic device, the electronic device is enabled to perform the method according to any one of the first aspect and the implementations of the first aspect.

According to a ninth aspect, this application provides a computer program product. When the computer program product is run on an electronic device, the electronic device is enabled to perform the method according to any one of the first aspect and the implementations of the first aspect.

DETAILED DESCRIPTION OF ILLUSTRATIVE EMBODIMENTS

The following describes the technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more of the features.

Embodiments of this application provide a page swap method, which may be applied to a separate storage system, or an electronic device including the storage system, or a separate application. The application may implement the page swap method in this application.

Before the page swap method in embodiments of this application is described, several concepts related to a memory management mechanism of the storage system are first described.

1. Page

In a memory management process, a page is a minimum unit of address space.

Generally, a page is 4 kilobytes (kilobyte, KB) or 64 KB.

2. Logical Memory and Logical Address Space, and a Physical Memory and Physical Address Space Memory space of a process is only a virtual memory, namely, the logical memory. The running of a program requires a real physical memory, namely, a random access memory (random access memory, RAM). If necessary, an operating system can map the logical memory applied for during program running to the RAM, so that the process can use the physical memory.

Memory space of the logical memory is referred to as the "logical address space". The logical address space may be divided into a plurality of virtual pages (virtual page, VP) of a fixed size, and a size of the virtual page may be 4 kilobytes (kilobyte, KB). Memory space of the physical memory is referred to as the "physical address space". The physical address space may be divided into a plurality of physical pages (physical page, PP) of a fixed size, and a size of the physical page may be 4 KB.

The virtual page is mapped with a file of a hard disk storage device, and then is cached to a physical page. For the process, logical addresses are used, and each process maintains a separate page table. The page table is an array structure, and stores status information of each virtual page, for example, status information indicating whether each virtual page is mapped or whether each virtual page is cached.

3. Virtual Memory Compression (zRAM) Technology

By performing paging on a system memory (RAM), the zRAM technology can replace a hard disk storage device with the system memory to provide swap space for a system. In this way, the system memory can be better used until the swap space of the hard disk storage device need to be used, to avoid paging on the hard disk storage device. Therefore, performance is improved.

Specifically, an area is allocated from the system memory (RAM) and serves as a swap (swap) area. If space of the system memory is insufficient, memory data occupied by an application is compressed and then is copied to the swap area. When swapping back to the application needs to be performed, the compressed data of the application can be directly restored to the memory. This saves time required for restarting the application. In addition, after the data in the swap area is compressed, more data of different applications can be stored, which expands the size of the system memory (RAM) in another way.

4. Process Execution Process

When a process is executed, when a value stored in a logical address needs to be accessed, a system first finds a virtual page (VP) in which the logical address is located, and then finds, based on a page table, a physical page (PP) corresponding to the virtual page (VP) in the page table.

If a page missing fault occurs, a kernel's page missing fault handler is invoked. Content of a missed page is cached from a correspondingly mapped file area of the hard disk storage device to a system memory (RAM).

Figure 1:
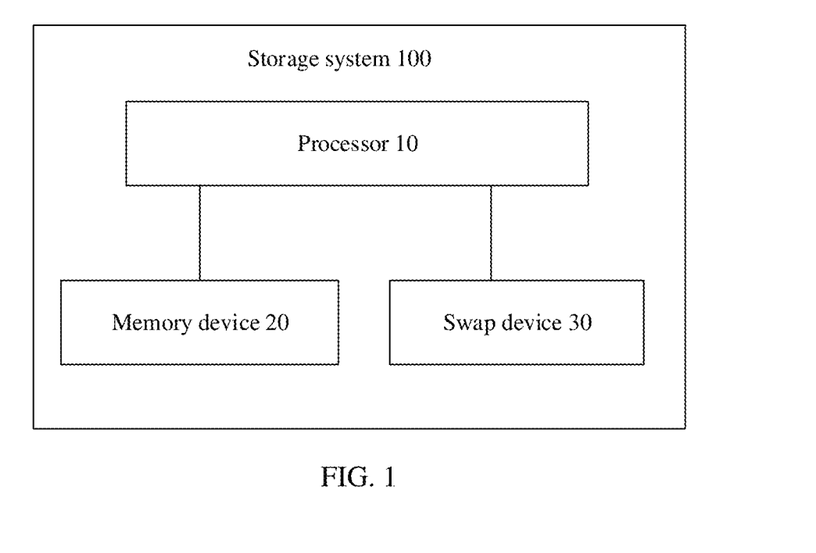
FIG. 1 is a schematic diagram of a structure of a storage system according to an embodiment of this application.

The foregoing describes the concepts related to the memory management mechanism of the storage system. The following describes the page swap method provided in embodiments of this application with reference to a storage system 100. FIG. 1 is a schematic diagram of a structure of a storage system 100 according to an embodiment of this application. As shown in FIG. 1, the storage system 100 may include a processor 10, a memory device 20, and a swap device 30.

For example, the processor 10 is a control center or a core component of the storage system 100, or may be a control center of an electronic device including the storage system. Optionally, the processor 10 may be connected to all parts of the entire electronic device through various interfaces and lines. By running or executing a software program and/or a module stored in the memory and invoking data stored in the memory, the processor 10 performs various functions of the electronic device and data processing, to perform overall monitoring on the electronic device. In this application, the processor 10 may control a data processing process, for example, a page swap process and a data read/write process.

Optionally, the processor 10 may correspond to a central processing unit (central processing unit, CPU) of the electronic device, and the processor 10 may include one or more processing units. The processor 10 may selectively include an arithmetic unit and a controller, may be configured to obtain instructions and process data, and may be specifically configured to perform instruction execution sequence control, operation control, and time control, and perform an arithmetic operation and a logical operation on data, or process other information and the like.

The memory device 20 is a most common system memory, and may also be referred to as a "memory" or a "system memory". The memory device 20 may maintain data for a very short time. To maintain data, the memory device 20 may store the data by using a capacitor charge, and therefore needs to be refreshed (refresh) at intervals. In addition, if the electronic device is powered off, data stored in the memory device 20 is lost.

Optionally, the memory device 20 internally includes a memory manager, the memory manager stores a memory index table, and the memory index table is used to indicate a block management rule of the memory device 20. The memory index table may include the page table described above, and is used to indicate a mapping relationship between a virtual page, a physical page, and a file in a hard disk storage device.

A mobile phone is used as an example. The memory device 20 may be a dynamic random access memory (dynamic random access memory, DRAM).

The swap device 30 is also referred to as a "swap area", and is configured to store a process, data, or the like that is swapped out of the memory device 20. Under a scheduling principle of the processor 10, some processes or data in the memory device 20 may be migrated to the swap device 30, to free up space of the memory device 20, which is referred to as a "swap-out process". Similarly, under the scheduling principle of the processor 10, some processes or data in the swap device 30 is migrated to the memory device 20, which is referred to as a "swap-in process".

It should be understood that the swap device 30 may be a storage device independent of the memory device 20, or may be a swap area formed by a part of the memory device 20.

A mobile phone is used as an example. When the memory device 20 is a DRAM, the swap device 30 may be an area in the DRAM; or the swap device may be an independent storage device, such as a flash memory (NAND flash memory, NAND). During page swap, some pages can be compressed and then stored in a memory of the mobile phone by using the zRAM technology described above. When a user needs to use the swap-out pages, a page missing fault occurs in the system, and the compressed pages are requested to be decompressed and be swapped back to the memory.

Alternatively, a personal computer (personal computer, PC) is used as an example. The swap device 30 is an external storage device independent of the memory device 20. During page swap, some pages can be swapped out to the external storage device of the PC. When a user needs to use the swap-out pages, a page missing fault occurs in the system, and the swap-out pages are requested to be swapped into the memory again. This is not limited in this application.

For example, when the user switches an application A to the foreground for use and closes an application B, the processor 10 may write a related process or data of the application A into the memory device 20, and migrate a related process or data of the application B in the memory device 20 to the swap device 30. When the user runs the application B again, the processor 10 may re-migrate, to the memory device 20, the process or data related to the application B in the memory device 20.

In addition, it should be understood that the storage system 100 may further include one or more interfaces or lines of different types. The interface may include an internal interface or an external interface. The line may include a system bus, a memory bus, an input/output (input/output, I/O) bus, or the like. The interface or the line may be configured to connect modules of the storage system. FIG. 1 is merely a schematic diagram of the storage system. For simplicity, FIG. 1 does not show the interface or the line.

It may be further understood that the storage system 100 may alternatively use different interface connection manners, or a combination of a plurality of interface connection manners. An interface type and an interface connection manner are not limited in this embodiment of this application.

It may be further understood that the structure shown in this embodiment of this application does not constitute a specific limitation on the storage system 100. In some other embodiments of this application, the storage system 100 may include more or fewer components than those shown in the figure, or combine some components, or split some components, or have different component arrangements. The components shown in the figure may be implemented by hardware, software, or a combination of software and hardware.

Optionally, the electronic device including the storage system 100 in this application may be a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or the like. A specific type of the electronic device is not limited in this embodiment of this application.

It should be understood that the foregoing listed electronic devices may further include more other components in addition to the foregoing storage system 100. For example, the electronic device may further include one or more of a charging management module, a power management module, a battery, an antenna, a mobile communications module, a wireless communications module, an audio module, a speaker, a receiver, a microphone, a headset jack, a sensor module, a button, a motor, an indicator, a camera, a display, a subscriber identification module (subscriber identification module, SIM) card interface, and the like. The sensor module may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. A quantity of components included in the terminal device and a type of a component are not limited in this embodiment of this application.

Figure 2:
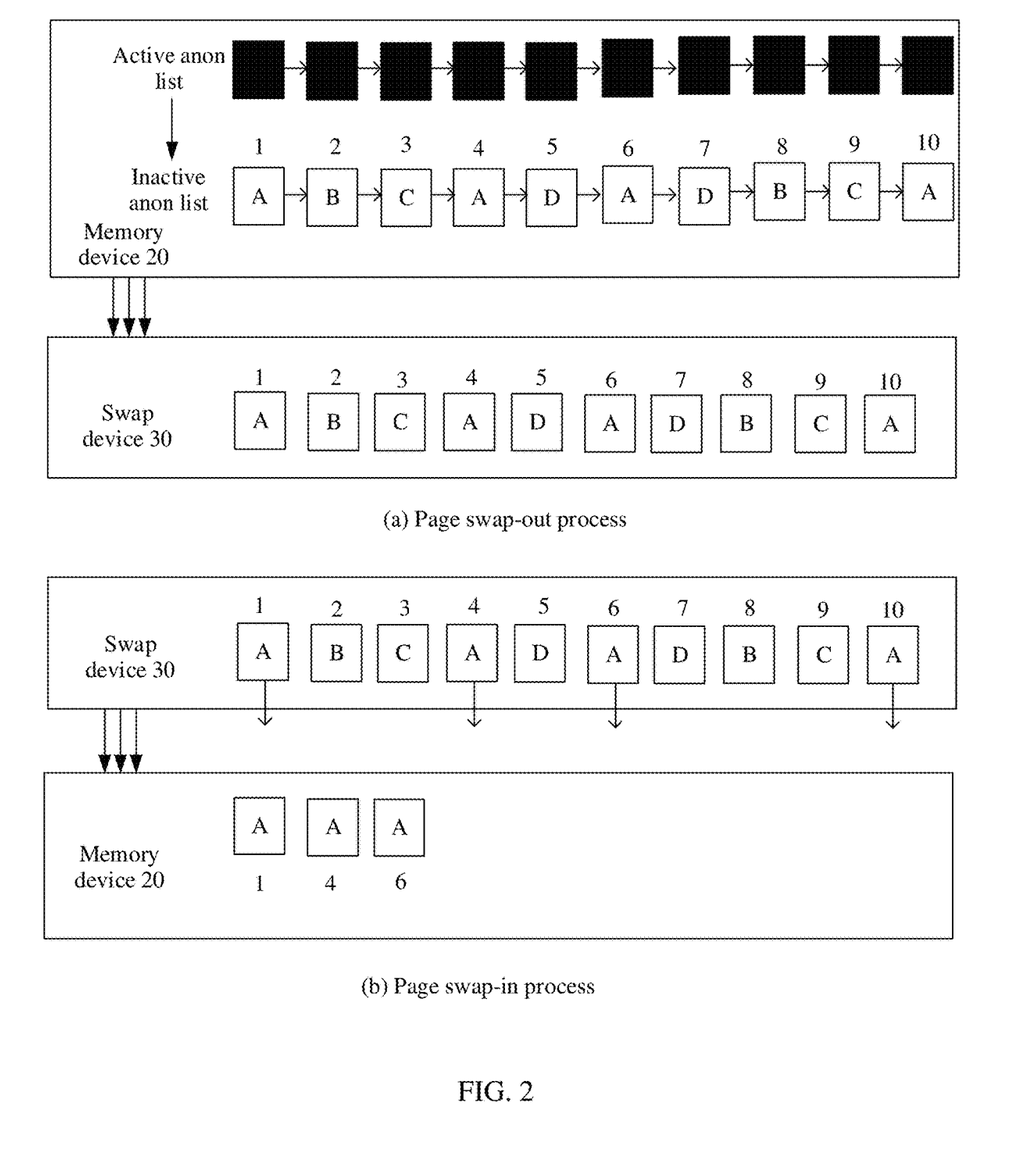
FIG. 2 is a schematic diagram of an example of a page swap process according to this application.

FIG. 2 is a schematic diagram of an example of a page swap process according to this application. In FIG. 2, figure (a) is a schematic diagram of a page swap-out stage, and figure (b) is a schematic diagram of a page swap-in stage.

In the page swap process, it is generally implemented based on a least recently used (least recently used, LRU) linked list. Specifically, a system kernel maintains an active anon list (active anon list) and an inactive anon list (inactive anon list). A page that is determined as cold by a kernel algorithm is swapped from the active anon list (active anon list) to the inactive anon list (inactive anon list). When a system performs memory reclamation, pages in the inactive anon list (inactive anon list) are swapped out of a memory in sequence until a memory requirement is met. The swap-out page is swapped into the memory when it is used by a user. In this application, a page to be swapped out in the inactive anon list is referred to as a "to-be-swapped-out page", and a page to be swapped in is referred to as a "target page".

In a page swap-out process shown in figure (a) in FIG. 2, active pages are listed in the active anon list, and the active page may be understood as a page with a high read frequency of the system or a page related to an application currently running in the system. When data of the active page is not read for a long time, the data is migrated from the active anon list to the inactive anon list, and then is swapped out from the inactive anon list to the swap device 30.

For example, small boxes in FIG. 2 represent pages of different applications. For example, a box A is a page of an application A. According to a sequence in which pages are migrated into the inactive anon list, for example, in figure (a), the sequence is as follows: a page of an application A, a page of an application B, a page of an application C, a page of the application A, a page of an application D, a page of the application A, a page of the application D, a page of the application B, a page of the application C, and a page of the application A, where all the pages are arranged, for ease of description, numbers 1 to 10 are used for marking, and the related pages related to the application A are respectively marked as 1, 4, 6, and 10.

It should be understood that the related pages 1, 4, 6, and 10 related to the application A are consecutive pages of a logical address of the application A. As shown in figure (a) in FIG. 2, in the page swap process, the pages are swapped out only according to the sequence of the LRU linked list, and the swap-out pages are logically not related. For example, the pages of the application A, the application B, the application C, the application A, the application D, the application A, the application D, the application B, the application C, and the application A are sequentially swapped out of the inactive anon-list, and adjacent pages in the linked list are also adjacently stored in the swap device after being swapped out. As a result, pages adjacently stored in the swap device may usually belong to different applications and are logically irrelevant. In other words, during page swap, pages of a same application are discretely stored in the swap device.

To improve swap-in efficiency, correspondingly, in a swap-in process, a page adjacent to the target page is considered to be swapped in, which is referred to as "prefetch". For example, if the target page is a related page 4 of the application A, adjacent pages of the related page 4 are also swapped in. The adjacent pages are related pages of the application C and the application D. In other words, a large quantity of prefetched pages may not belong to a same application. As a result, prefetch accuracy in the swap-in stage is very low. If a prefetched related page of another application (for example, a related page of the application C and a related page of the application D) is not subsequently used by the system, a memory capacity is occupied, to affect performance of the system.

In another possible implementation, to improve prefetch accuracy, pages of consecutive logical addresses are prefetched. For example, as shown in figure (b) in FIG. 2, related pages 1, 4, 6, and 10 of the application A are pages with consecutive logical addresses. When the target page is swapped in, previous and next pages whose logical addresses are adjacent to that of the target page are swapped back to the memory at the same time. In other words, when the related page 4 of the application A is swapped in, both the related pages 1 and 6 whose logical addresses are adjacent to that of the related page 4 and that are of the application A are also swapped back to the memory.

In the foregoing manner, the prefetch accuracy is improved to some extent. However, physical addresses of the swap-in related pages 1, 4, and 6 of the application A actually stored in the swap device 30 are nonconsecutive, that is, the prefetched related pages 1, 4, and 6 of the application A are discretely stored in storage space of the swap device 30, and the physical addresses are not adjacent. Performance of a swap-in process of discrete data is low, affecting user experience in using the application A.

Figure 3:
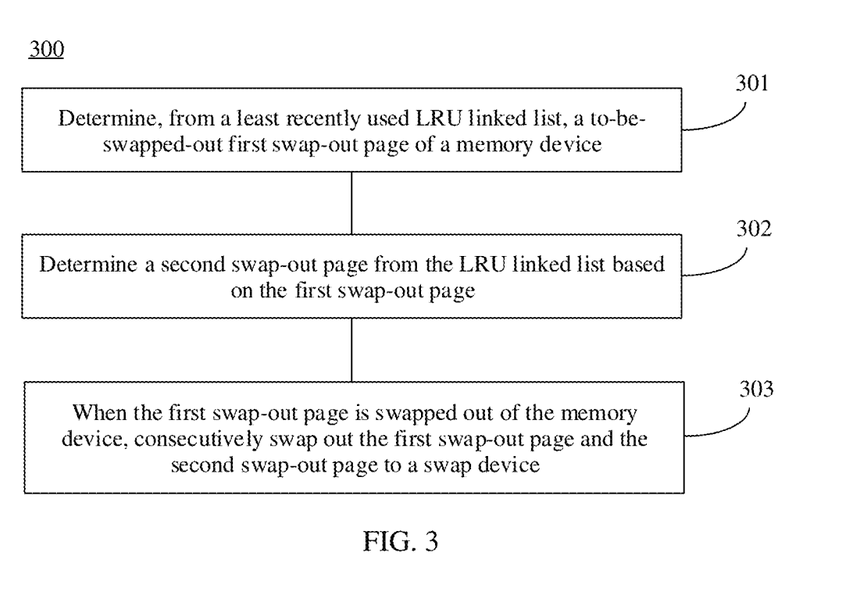
FIG. 3 is a schematic flowchart of an example of a page swap method according to an embodiment of this application.

FIG. 3 is a schematic flowchart of an example of a page swap method according to an embodiment of this application. The method may be implemented in the storage system 100 shown in FIG. 1. The memory device 20 of the storage system 100 stores a memory mapping table and a plurality of pages of different applications. Specifically, the method may be performed by the processor 10. As shown in FIG. 3, the method 300 may include the following steps.

301: The processor 10 determines, from the plurality of pages stored in the memory device 20, a to-be-swapped-out first swap-out page of the memory device.

302: The processor 10 determines a second swap-out page from an LRU linked list based on the first swap-out page.

303: When the first swap-out page is swapped out of the memory device, the processor 10 consecutively swaps out the first swap-out page and the second swap-out page to the swap device.

It should be understood that the "first swap-out page" herein may be any one of a plurality of to-be-swapped-out pages stored in the memory device 20. For example, the first swap-out page is a page in the LRU linked list.

In a possible implementation, the first swap-out page and the second swap-out page have a same application identifier, and the processor 10 may determine the application identifier of the first swap-out page, and determine, from the LRU linked list, a to-be-swapped-out page that has a same application identifier as the first swap-out page, as the second swap-out page.

In a possible implementation, the processor 10 may obtain a logical address of the first swap-out page, determine the application identifier of the first swap-out page based on the memory mapping table and the logical address of the first swap-out page, and determine, from the LRU linked list, the to-be-swapped-out page that has the same application identifier as the first swap-out page, as the second swap-out page.

Optionally, the memory device 20 in this embodiment of this application includes a memory manager. The memory manager may maintain the memory mapping table, and the memory mapping table is used to indicate a correspondence between a logical address and an application identifier of the memory device 20. Optionally, the memory mapping table may be generated by the processor 10 and stored in the memory manager of the memory device 20. This is not limited in this embodiment of this application.

Table 1 is the memory mapping table of an example of the memory device 20 according to this embodiment of this application. As shown in the Table 1, storage space of the memory device 20 may be divided into a plurality of areas. Each area of the memory device has a different logical address, and the logical address may be distinguished by using a page global directory (page global directory, PGD) address.

It should be understood that each application (application, APP) used by a user has a unique identifier (identifier, ID). In a use process of the application, a memory capacity may be applied for in sequence, and different areas are divided for different applications based on a user request. When the user uses an application A, the application A requests a memory capacity from the processor 10, and the processor 10 may obtain an ID of the application A, and allocate, based on a request of the application A and in the memory device 20, a memory area whose logical address is PGD 1 to the application A and a memory area whose logical address is PGD 2 to an application B. Accordingly, the memory mapping table as shown in Table 1 may be obtained, and the memory manager of the memory device 20 may store the memory mapping table.

TABLE 1

| Logical address | Application identifier |
| --- | --- |
| PGD 1 | Application A |
| PGD 2 | Application B |
| PGD 3 | Application C |

TABLE 1-continued

| Logical address | Application identifier |
| --- | --- |
| PGD 4 | Application A |
| PGD 5 | Application D |
| PGD 6 | Application A |
| PGD 7 | Application D |
| PGD 8 | Application B |
| PGD 9 | Application C |
| PGD 10 | Application A |
| ... | ... |

In a possible implementation, during page swap-out, a logical address of a to-be-swapped-out page is determined based on the LRU linked list.

Optionally, in a page swap process, logical backtracking is performed on each page in an inactive anon list or an active anon list, to determine a logical address of each page.

For example, a logical backtracking process of each page may be understood as: determining a logical address of the page level by level based on a structure of a page table. For example,

```
address_space *mapping
vm_area_ struct *vm (vm_area_struct describing a structure of an area)
mm_ struct *mm (mm_struct structure describing a running status of a virtual memory)
pgd_ t *pgd (pgd pointer pointing to a base address of a level-1 page table of a process)
```

The foregoing enumerated vm_area_struct*vm, mm_struct*mm, and pgd_t*pgd may be understood as pointer addresses. A data structure is not limited in this application. Regardless of a quantity of levels of data structures, the base address of a level-1 page table to which a PGD pointer points may be determined according to the foregoing logical backtracking method, so that the logical address of the to-be-swapped-out page is determined. For example, when it is determined that the logical address of the to-be-swapped-out page is PGD 4, an application identifier corresponding to the to-be-swapped-out page may be learned according to the memory mapping table, that is, the application A to which the to-be-swapped-out page belongs is determined.

It should be understood that in the foregoing process, the logical address of each page may be determined for the pages in the active anon list, or the logical address of each page may be determined for the pages in the inactive anon list. This is not limited in this embodiment of this application. Determining the logical address of each page in the inactive anon list can reduce a quantity of pages whose logical addresses need to be determined, and therefore, an operation amount of the processor 10 can be reduced to some extent.

After the logical address of the to-be-swapped-out page is determined in the foregoing steps, if the to-be-swapped-out page has a same application identifier, the system may determine that the to-be-swapped-out page belongs to a same application. Therefore, it may be determined, based on this, which pages in the to-be-swapped-out pages in the LRU linked list are logically related pages belonging to a same application.

When the to-be-swapped-out page is swapped out of the memory device 20, a page that has a first application identifier and that is in the to-be-swapped-out page is swapped out to the swap device.

Figure 4:
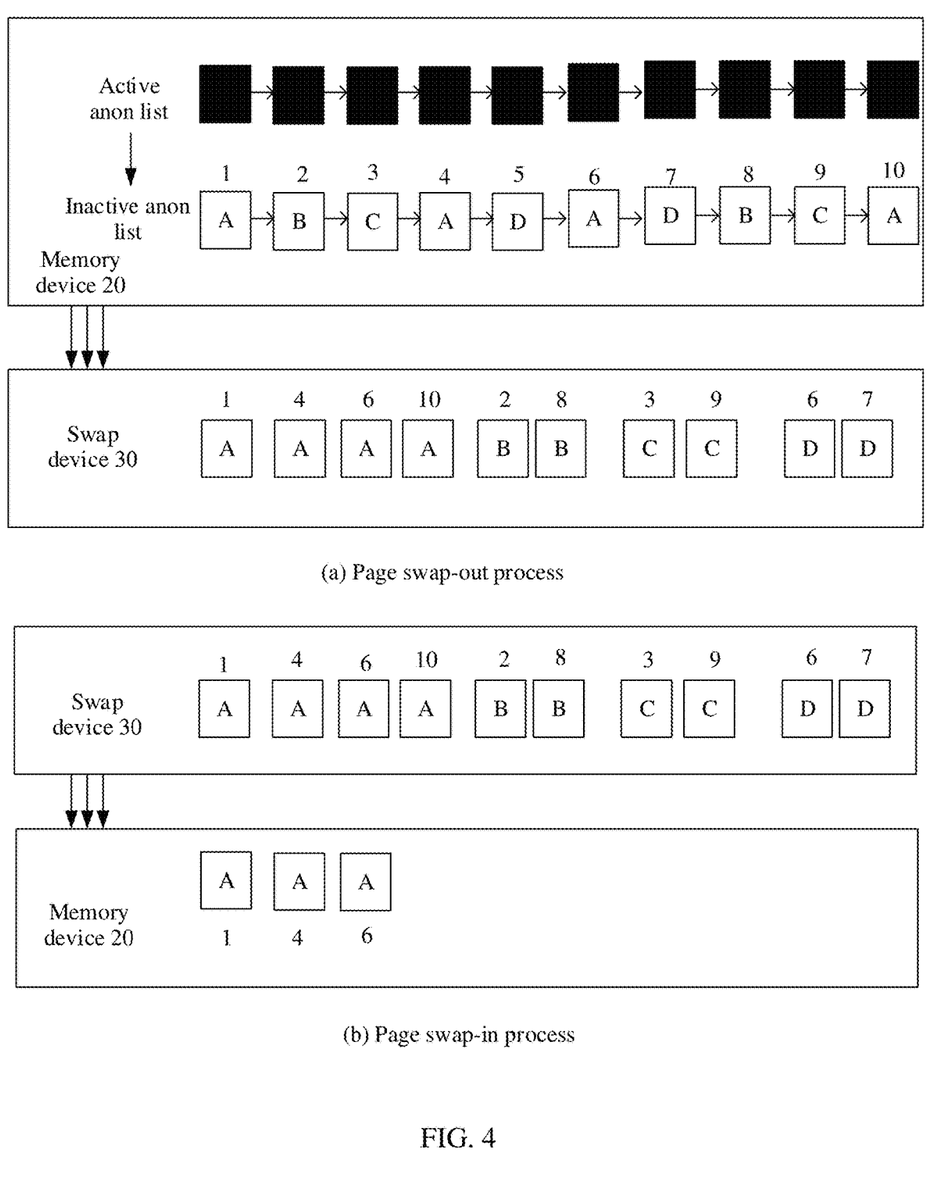
FIG. 4 is a schematic diagram of another example of a page swap process according to an embodiment of this application.

FIG. 4 is a schematic diagram of another example of a page swap process according to an embodiment of this application. In FIG. 4, figure (a) is a schematic diagram of a page swap-out process, and figure (b) is a schematic diagram of a page swap-in process. As shown in figure (a) in FIG. 4, a page in an inactive anon list is referred to as a "to-be-swapped-out page". When the to-be-swapped-out page is migrated from the inactive anon list to the swap device 30, an application ID to which each page belongs is further determined based on a logical address of each page determined in step 302, and pages having a same application ID are consecutively swapped out to the swap device 30.

It should be understood that the pages having the same application ID are consecutively swapped out to the swap device 30, so that it can be ensured that the pages swapped out to the swap device 30 are logical consecutive pages. In addition, in the swap device 30, the logical consecutive pages are stored together, and may have consecutive physical addresses. For example, related pages 1, 4, 6, and 10 of the application A are consecutively swapped out to the swap device 30, and physical addresses occupied by the related pages 1, 4, 6, and 10 of the application A in the swap device 30 are also consecutive. Compared with the conventional technology, this process can implement consecutive storage of logically related pages of a same application. In addition, the physical addresses of the related pages 1, 4, 6, and 10 of the application A in the swap device 30 are consecutive, so that spatial locality of the zRAM can be improved.

When a swap-in request for a target page is received, the target page is swapped from the swap device to the memory device in response to the swap-in request for the target page, and an adjacent page of the target page is preloaded.

In a possible implementation, in response to the swap-in request for the target page, the processor 10 simultaneously swaps the target page and the adjacent page of the target page to the memory device 20.

Alternatively, the target page is swapped from the swap device to the memory device, and the adjacent page of the target page is preloaded. In the preloading process, preloading may be implemented by a memory manager by using a cache (cache). Details are not described herein again.

Specifically, after logically related pages of a same application are swapped out according to step 301 to step 303 described above, the logically related pages are also consecutively stored in the swap device 30, that is, physical address continuity is implemented. In a page swap-in process, for a target page that needs to be swapped in, the target page and a page adjacent to the target page may be swapped into the memory according to a prefetch principle. This prefetch process can ensure that a swap-in page is a logically related page of a same application, so that prefetch accuracy in the swap-in process is improved.

For example, as shown in figure (b) in FIG. 4, when the related page 4 of the application A is the target page, the related page 4, the related page 1, and the related page 6 of the application A are swapped into the memory device 20 in the swap-in process. Alternatively, all related pages 1, 4, 6, and 10 of the application A may be swapped into the memory device 20. This is not limited in this embodiment of this application.

In conclusion, according to the page swap method provided in this embodiment of this application, for a to-be-swapped-out page in an LRU linked list, an application ID of each page is further determined by determining a logical address of each to-be-swapped-out page, to determine to-be-swapped-out pages belonging to a application. Further, in a page swap-out process, the pages that belong to the same application and that are in the to-be-swapped-out pages are preferentially swapped out consecutively, and swap-out pages that belong to the same application are stored consecutively in the swap device. In the page swap-out process, logically related pages of a same application can be stored consecutively based on a logical correlation of the to-be-swapped-out pages and an LRU linked list sequence.

Correspondingly, in the page swap-in process, for the target page to be swapped in, the target page and the page adjacent to the target page are swapped into the memory according to a prefetch principle, so that it can be ensured that a swap-in page is a logically related page of a same application, thereby improving prefetch accuracy in the swap-in process. This improves running performance of a system.

In a possible implementation, the system may further determine, based on a service identifier or a process identifier, to swap pages having a same service identifier or a same process identifier out of the swap device.

Specifically, the method in this application may be further used in different service processes. Each service may include a plurality of processes, and each service may have a fixed identifier or each process may have a different identifier. In this case, in the page swap-out process, in addition to the application identifier, the system may further perform the page swap-out process based on a process identifier or a service identifier.

For example, a system may determine, based on a service identifier, to swap out a page having the same service identifier to the swap device. Correspondingly, in a page swap-in process, an adjacent page having the same service identifier as a target page is swapped into the memory device.

Alternatively, in the page swap-out process, a system may determine, based on a process identifier, to swap out a page having the same process identifier to the swap device. Correspondingly, in a page swap-in process, an adjacent page having the same process identifier as a target page is swapped into the memory device. This is not limited in this embodiment of this application.

Figure 5:
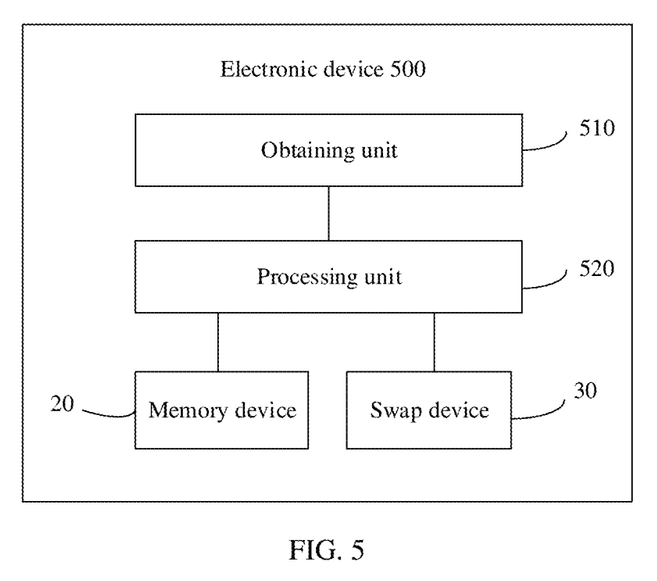
FIG. 5 is a schematic diagram of a structure of an example of an electronic device according to an embodiment of this application.

FIG. 5 is a schematic diagram of a structure of an example of an electronic device 500 according to an embodiment of this application. The electronic device 500 includes an obtaining unit 510, a processing unit 520, a memory device 20, and a swap device 30. The memory device 20 stores a memory mapping table and a plurality of pages of different applications. The memory mapping table is used to indicate a correspondence between a logical address and an application identifier of each of the plurality of pages. The electronic device includes the obtaining unit 510 and the processing unit 520.

The processing unit 520 is configured to determine, from a least recently used LRU linked list, a to-be-swapped-out first swap-out page of the memory device.

The processing unit 520 is further configured to: determine a second swap-out page from the LRU linked list based on the first swap-out page; and when the first swap-out page is swapped out of the memory device 20, consecutively swap out the first swap-out page and the second swap-out page to the swap device 30.

In a possible implementation, the first swap-out page and the second swap-out page have a same application identifier, and the processing unit 520 is specifically configured to: determine the application identifier of the first swap-out page, and determine, from the LRU linked list, a to-be-swapped-out page that has a same application identifier as the first swap-out page, as the second swap-out page.

In a possible implementation, the memory device stores the memory mapping table, and the memory mapping table is used to indicate the correspondence between the logical address and the application identifier of each of the plurality of pages. The obtaining unit 510 is configured to obtain a logical address of the first swap-out page; and the processing unit 520 is further configured to: determine the application identifier of the first swap-out page based on the memory mapping table and the logical address of the first swap-out page; and determine, from the LRU linked list, the to-be-swapped-out page that has the same application identifier as the first swap-out page, as the second swap-out page.

The processing unit 520 is further configured to: when receiving a swap-in request for a target page, swap the target page from the swap device 30 to the memory device 20 in response to the swap-in request for the target page, and preload an adjacent page of the target page.

It should be understood that the electronic device 500 may further include more functional modules, or two or more functions may be integrated into one processing module. Each functional module may implement the page swap method 300 in FIG. 3, and is configured to perform corresponding steps in the method 300. For brevity, details are not described herein again.

It should be further understood that the page swap method in this application may be applied to the storage system 100 shown in FIG. 1, or may be applied to an electronic device such as a mobile phone, a tablet, a PC, or a smartwatch. In a page swap process, storage continuity of logically related pages in a swap-out stage is ensured. Correspondingly, in a page swap-in process, it is ensured that a swap-in page is a logically related page of a same application, so that prefetch accuracy in the swap-in process is improved. This improves performance of the system.

It may be understood that, when the page swap method is applied to the electronic device such as the mobile phone, the tablet, the PC, or the smartwatch, to implement the foregoing functions, the electronic device includes corresponding hardware and/or software modules for performing the functions. Algorithm steps in the examples described with reference to embodiments disclosed in this specification can be implemented by hardware or a combination of hardware and computer software in this application. Whether a function is performed in a manner of hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module may be obtained through division based on corresponding functions, or two or more functions may be integrated into one processing module. The integrated module may be implemented in a form of hardware. It should be noted that, in embodiments, division into modules is an example and is merely logical function division. During actual implementation, there may be another division manner.

When each functional module is obtained through division based on each corresponding function, the electronic device may include a display unit, a detection unit, and a processing unit. It should be noted that all related content of the steps in the foregoing method embodiments may be cited in function description of corresponding functional modules. Details are not described herein again.

The electronic device provided in embodiments is configured to perform the page swap method. Therefore, an effect same as the effect of the foregoing implementation methods can be achieved.

When an integrated unit is used, the electronic device may include a processing module, a storage module, and a communications module. The processing module may be configured to control and manage actions of the electronic device, for example, may be configured to support the electronic device in performing the steps performed by the display unit, the detection unit, and the processing unit. The storage module may be configured to support the electronic device to store program code, data, and the like. The communications module may be configured to support communications between the electronic device and another device.

The processing module may be a processor or a controller. The processor may implement or execute various example logical blocks, modules, and circuits described with reference to content disclosed in this application. The processor may alternatively be a combination of processors implementing a computing function, for example, a combination of one or more microprocessors or a combination of a digital signal processor (digital signal processor, DSP) and a microprocessor. The storage module may be a memory. The communications module may be specifically a device that interacts with another electronic device, such as a radio frequency circuit, a Bluetooth chip, or a Wi-Fi chip.

In an embodiment, the processing module may be a processor, the storage module is a memory, and the electronic device in this embodiment may be a mobile phone, a tablet, a PC, a smartwatch, or the like.

An embodiment further provides a computer storage medium. The computer storage medium stores computer instructions. When the computer instructions are run on an electronic device, the electronic device is enabled to perform the related method steps, to implement the page swap method in the foregoing embodiments.

An embodiment further provides a computer program product. When the computer program product is run on a computer, the computer is enabled to perform the foregoing related steps, to implement the page swap method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the page swap method in the foregoing method embodiments.

The electronic device, the computer storage medium, the computer program product, and the chip provided in the embodiments are all configured to perform a corresponding method provided above. Therefore, for beneficial effects that can be achieved by the electronic device, the computer storage medium, the computer program product, and the chip, refer to beneficial effects of the corresponding method provided above. Details are not described herein again.

The foregoing descriptions about implementations allow a person skilled in the art to understand that, for the purpose of convenient and brief description, division of the foregoing functional modules is taken as an example for illustration. During actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A page swap method, wherein the method is applied to a storage system comprising a processor, a memory device, and a swap device, wherein the memory device stores a plurality of pages of different applications, and the method comprises:

determining, from a least recently used (LRU) linked list, a to-be-swapped-out first swap-out page of the memory device;

determining a second swap-out page from the LRU linked list based on the first swap-out page, wherein the first swap-out page and the second swap-out page have a same application identifier, and the first swap-out page and the second swap-out page in the LRU linked list are not adjacent; and swapping out, based on the previously determined first swap-out page needing to be swapped out of the memory device, the first swap-out page and the second swap-out page to the swap device, wherein physical addresses occupied by the first swap-out page and the second swap-out page in the swap device are consecutive.

2. The method according to claim 1, wherein the determining the second swap-out page from the LRU linked list based on the first swap-out page comprises:

determining the application identifier of the first swap-out page; and determining, from the LRU linked list, a to-be-swapped-out page as the second swap-out page that has the same application identifier as the first swap-out page.

3. The method according to claim 1, wherein the memory device stores a memory mapping table, the memory mapping table indicates a correspondence between a logical address and an application identifier of each of the plurality of pages, and the determining the second swap-out page from the LRU linked list based on the first swap-out page comprises:

obtaining a logical address of the first swap-out page;

determining the application identifier of the first swap-out page based on the memory mapping table and the logical address of the first swap-out page; and determining, from the LRU linked list, a to-be-swapped-out page as the second swap-out page that has the same application identifier as the first swap-out page.

4. The method according to claim 3, wherein the logical address of each of the plurality of pages is a page global directory (PGD) address.

5. The method according to claim 1, wherein the method further comprises:

swapping, in response to a swap-in request for the first swap-out page, the first swap-out page from the swap device to the memory device; and preloading the second swap-out page.

6. The method according to claim 1, wherein the consecutively swapping out the first swap-out page and the second swap-out page to the swap device comprises:

simultaneously swapping out the first swap-out page and the second swap-out page to the swap device; or consecutively swapping out the first swap-out page and the second swap-out page to the swap device in a first sequence.

7. The method according to claim 6, wherein the first sequence is an arrangement sequence of pages with a same application identifier in the LRU linked list.

8. The method according to claim 1, wherein the method further comprises:

determining a quantity of the to-be-swapped-out pages according to a space capacity of the memory device; and determining a quantity of to-be-swapped-in target pages according to the space capacity of the memory device.

9. An electronic device, comprising:
a memory device storing a plurality of pages of different applications;
a swap device; and
a processing unit configured to:
determine, from a least recently used (LRU) linked list, a to-be-swapped-out first swap-out page of the memory device;
determine a second swap-out page from the LRU linked list based on the first swap-out page, wherein the first swap-out page and the second swap-out page have a same application identifier, and the first swap-out page and the second swap-out page in the LRU linked list are not adjacent; and
swap out, based on the previously determined first swap-out page needing to be swapped out of the memory device, the first swap-out page and the second swap-out page to the swap device, wherein physical addresses occupied by the first swap-out page and the second swap-out page in the swap device are consecutive.

10. The electronic device according to claim 9, wherein the processing unit is further configured to:
determine the application identifier of the first swap-out page; and
determine, based on the LRU linked list, a to-be-swapped-out page as the second swap-out page that has the same application identifier as the first swap-out page.

11. The electronic device according to claim 9, wherein the memory device stores a memory mapping table, the memory mapping table indicates a correspondence between a logical address and an application identifier of each of the plurality of pages, and the electronic device further comprises:
an obtaining unit, configured to obtain a logical address of the first swap-out page;
wherein the processing unit is further configured to:
determine the application identifier of the first swap-out page based on the memory mapping table and the logical address of the first swap-out page; and
determine, from the LRU linked list, a to-be-swapped-out page as the second swap-out page that has the same application identifier as the first swap-out page.

12. The electronic device according to claim 11, wherein the logical address of each of the plurality of pages is a page global directory (PGD) address.

13. The electronic device according to claim 9, wherein the processing unit is further configured to:
swap, in response to a swap-in request for the first swap-out page, the first swap-out page from the swap device to the memory device; and
preload the second swap-out page.

14. The electronic device according to claim 9, wherein the processing unit being configured to consecutively swap out the first swap-out page and the second swap-out page to the swap device further includes the processing unit being configured to:
simultaneously swap out the first swap-out page and the second swap-out page to the swap device; or
consecutively swap out the first swap-out page and the second swap-out page to the swap device in a first sequence.

15. The electronic device according to claim 14, wherein the first sequence is an arrangement sequence of pages with a same application identifier in the LRU linked list.

16. The electronic device according to claim 9, wherein the processing unit is further configured to:
determine a quantity of the to-be-swapped-out pages according to a space capacity of the memory device; and
determine a quantity of to-be-swapped-in target pages according to the space capacity of the memory device.

17. A non-transitory computer-readable storage medium storing a program to be executed by a processor in an electronic device, wherein the electronic device comprises the processor, a memory device, and a swap device, wherein the memory device stores a plurality of pages of different applications, the program including instructions for:
determining, from a least recently used (LRU) linked list, a to-be-swapped-out first swap-out page of the memory device that stores the plurality of pages of different applications;
determining a second swap-out page from the LRU linked list based on the first swap-out page, wherein the first swap-out page and the second swap-out page have a same application identifier, and the first swap-out page and the second swap-out page in the LRU linked list are not adjacent; and
swapping out, based on the previously determined first swap-out page needing to be swapped out of the memory device, the first swap-out page and the second swap-out page to the swap device, wherein physical addresses occupied by the first swap-out page and the second swap-out page in the swap device are consecutive.

18. The non-transitory computer-readable storage medium according to claim 17, wherein the instructions for determining the second swap-out page from the LRU linked list based on the first swap-out page further comprise instructions for:
determining the application identifier of the first swap-out page; and
determining, from the LRU linked list, a to-be-swapped-out page as the second swap-out page that has the same application identifier as the first swap-out page.

19. The non-transitory computer-readable storage medium according to claim 17, wherein the memory device stores a memory mapping table, the memory mapping table indicates a correspondence between a logical address and an application identifier of each of the plurality of pages, and the instructions for determining the second swap-out page from the LRU linked list based on the first swap-out page further comprises instructions for:
obtaining a logical address of the first swap-out page;
determining the application identifier of the first swap-out page based on the memory mapping table and the logical address of the first swap-out page; and
determining, from the LRU linked list, a to-be-swapped-out page as the second swap-out page that has the same application identifier as the first swap-out page.

20. The non-transitory computer-readable storage medium according to claim 17, wherein the instructions further comprise instructions for:
swapping, in response to a swap-in request for the first swap-out page, the first swap-out page from the swap device to the memory device; and
preloading the second swap-out page.

* * * * *